(12) United States Patent
Towler et al.

(10) Patent No.: US 7,022,229 B1
(45) Date of Patent: Apr. 4, 2006

(54) ADSORPTION SEPARATION SYSTEM

(75) Inventors: Gavin P. Towler, Barrington, IL (US); Stephen R. Dunne, Algonquin, IL (US); Robert T. Sprague, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/740,875

(22) Filed: Dec. 19, 2003

(51) Int. Cl.
*B01D 15/02* (2006.01)

(52) U.S. Cl. .................. 210/264; 210/267; 210/284

(58) Field of Classification Search .......... 210/264, 210/267, 278, 284, 289; 137/625.15
See application file for complete search history.

(56) References Cited

U.S. PATENT DOCUMENTS

| | | | |
|---|---|---|---|
| 2,985,589 A | 5/1961 | Broughton et al. ............ 210/34 |
| 3,040,777 A | 6/1962 | Carson et al. .......... 137/625.15 |
| 3,201,491 A | 8/1965 | Stine et al. ................. 260/676 |
| 4,157,267 A | 6/1979 | Odawara et al. ........... 127/46 A |
| 4,182,633 A | 1/1980 | Ishikawa et al. ........... 127/46 A |
| 4,313,015 A | 1/1982 | Broughton ................... 585/828 |
| 4,319,929 A | 3/1982 | Fickel ......................... 127/46.2 |
| 4,402,832 A | 9/1983 | Gerhold ....................... 210/659 |
| 4,409,033 A | 10/1983 | LeRoy ....................... 127/46.2 |
| 5,080,700 A | 1/1992 | Bergloff et al. ................ 55/181 |
| 5,130,001 A | 7/1992 | Snyder et al. ............ 204/157.2 |
| 5,316,255 A * | 5/1994 | Marcusen .................... 248/362 |
| 5,478,475 A * | 12/1995 | Morita et al. ................ 210/676 |
| 5,676,826 A * | 10/1997 | Rossiter et al. ................ 210/91 |
| 5,685,897 A | 11/1997 | Belding et al. ................ 96/154 |

OTHER PUBLICATIONS

Dr. Ing. Herbert Knauer GmbH, CSEP® C9 Series Simulated Moving Bed Chromatography Systems Manual, Dec. 2000.

* cited by examiner

*Primary Examiner*—Ivars C. Cintins
(74) *Attorney, Agent, or Firm*—John G. Tolomei; Frank S. Molinaro; Arthur E. Gooding

(57) ABSTRACT

An apparatus is presented for separating chemicals using adsorption separation methods. The apparatus uses a plurality of adsorption units holding adsorbent, where the adsorption units are serially connected and are moved to shift the relative position of the feeds and drawoffs to the apparatus.

18 Claims, 4 Drawing Sheets

ADSORPTION SEPARATION SYSTEM

FIELD OF THE INVENTION

The invention relates to an apparatus useful for contacting a fluid with beds of solid materials. The invention is directly related to an apparatus for use in contacting a flowing liquid stream with an absorbent or adsorbent as in an adsorptive separation process. The invention is specifically directed to a system with a plurality of contacting beds with distribution and collection ports placed at several intermediate points between neighboring beds, allowing for the addition or withdrawal of a fluid stream at these points.

BACKGROUND OF THE INVENTION

The separation of various substances through selective adsorption is an important process for producing pure substances. However, this generally is a batch process, but with the development of simulated moving bed (SMB) technology, the adsorption separation process can be operated on a continuous basis. For simulated moving bed technology, the process uses a multiport rotary valve to redirect flow lines in the process. The simulation of a moving adsorbent bed is described in U.S. Pat. No. 2,985,589 (Broughton et al.). In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations (or origins) of at least three other streams, which may be streams entering the beds, such as the feed stream, or leaving the beds. The moving bed simulation may be simply described as dividing the bed into series of fixed beds and moving the points of introducing and withdrawing liquid streams past the series of fixed beds instead of moving the beds past the introduction and withdrawal points. A rotary valve used in the Broughton process may be described as accomplishing the simultaneous interconnection of two separate groups of conduits.

There are many different process requirements in moving bed simulation processes, resulting in different flow schemes and thus variations in rotary valve arrangement. For example, in addition to the four basic streams described in Broughton (U.S. Pat. No. 2,985,589), it may be desirable to utilize one or more streams to purge, or flush, a pipeline or pipelines. A flush stream is used to prevent undesirable mixing of components. The flush substance is chosen to be one which is not undesirable for mixing with either main stream, that being purged or that which enters the pipeline after flushing is completed. U.S. Pat. No. 3,201,491 (Stine et al.) may be consulted for information on flushing lines as applied to the process of Broughton (U.S. Pat. No. 2,985,589). It may be desirable to pass fluid through a bed or beds in the reverse direction from normal flow. This is commonly known as backflushing, a subject treated in U.S. Pat. No. 4,319,929 (Fickel). Other applications for various arrangements of multiport rotary disc valves may be seen in U.S. Pat. No. 4,313,015 (Broughton); U.S. Pat. No. 4,157,267 (Odawara et al.); U.S. Pat. No. 4,182,633 (Ishikawa et al.); and U.S. Pat. No. 4,409,033 (LeRoy).

While the multiport rotary disc valve of Carson (U.S. Pat. No. 3,040,777) provided a satisfactory valve design for the simultaneous interconnection of two independent groups of conduits such that each conduit of the first group could be brought into individual communication with every conduit of the second group, it is not suitable when three groups of conduits must be simultaneously interconnected in the same manner. Upon reference to Broughton (U.S. Pat. No. 2,985,589), it can be seen that there are only two groups of conduits which need to be interconnected when the arrangement of the drawing of that patent is utilized. One group consists of the conduits which provide the flows entering and leaving the simulated moving bed adsorbent system, that is, the flows which are switched among the beds, such as the feed stream. A second group consists of the conduits associated with the individual beds, that is, which supply and remove fluid from the beds, one conduit being connected between each two beds. It is to be noted that each conduit of the second group serves that dual function of supply and removal, so that it is unnecessary to provide conduits for supplying fluid separate from those for removing fluid.

When it is necessary to simultaneously interconnect conduits of three different groups of conduits in accordance with a previously determined cycle, the apparatus of the present invention may be used. An example of process involving three conduit groups may be found in U.S. Pat. No. 4,402,832 (Gerhold), which is described below. As mentioned above, it is highly desirable to use a single device to do so, thereby avoiding the obvious problems associated with numerous separate valves which must be simultaneously actuated.

One of the issues associated with simulated moving bed technology and rotary valves is the need for cross-over lines to make the appropriate connections when the rotary valve shifts the source of the feed inlets and the drawoff outlets relative to the bed. The cross-over lines often need to be long and create back mixing problems.

An alternative to simulated moving beds is a true moving bed wherein an adsorbent bed is moved to regions of different operating conditions to change from adsorption to desorption. One such example is an adsorbent wheel as shown in U.S. Pat. No. 5,685,897. The adsorbent wheel has two parts where air flowing over one part in a first region deposits moisture in the adsorbent and as the adsorbent is moved to a second region the moisture is given up to another air stream. Alternate designs exist for what are essentially adsorbent wheels wherein individual adsorbent beds are moved through different operating regions to purify a gas as shown in U.S. Pat. No. 5,080,700. Another form of a true moving bed involves a continuous rotating annular chromatograph, as shown in U.S. Pat. No. 5,130,001. An annular adsorbent bed moves under a feedstream inlet and at least one eluent inlet. As the material travels through the adsorbent bed there is separation of a mixture, and when the material leaves the bottom of the adsorbent bed, it is collected in a series of collection outlets.

There is substantial room for improvement in design that can simplify the adsorption separation device structure and also reduce back mixing.

SUMMARY OF THE INVENTION

The invention provides for a fluid-solid contacting apparatus for use in separating compounds in the fluid phase. The apparatus is adapted for the small scale separation of compounds and comprises at least three adsorbent units, with each adsorbent unit having an inlet, an outlet, and at least one bed of adsorbent material. The apparatus further comprises a rotating plate assembly. The rotating plate assembly has a substantially flat sealing surface and includes a plurality of ports equal to twice the number of adsorbent units. The adsorbent units are attached to the rotating plate assembly with each adsorbent unit inlet and outlet in fluid communication with a port on the rotating plate assembly. The ports are distributed around an axis of rotation, around which the rotating plate assembly is turned. The apparatus further includes a stationary plate assembly which has a substantially flat seating surface that is pressed against the sealing surface of the rotating plate assembly. The stationary plate assembly has a plurality of ports that correspond to the ports on the rotating plate assembly. The stationary plate assembly further includes a plurality of connecting conduits for fluid communication between pairs of ports on the stationary plate assembly, with two of the ports on the stationary plate assembly unconnected to the connecting conduits. The connecting conduits provide for a serial connection of the adsorbent units when the stationary plate ports are in fluid communication with the rotating plate ports. The apparatus further includes an inlet for a feedstream, an inlet for a desorbent stream, an outlet for an extract stream, and an outlet for a raffinate stream. This invention provides a simplification of piping for an adsorption separation system and by moving the beds instead of the complicated rerouting of flows through a complex system of piping enables for less back mixing better maintenance of the sharp fronts for a good separation of components in the feedstream.

Other objects, advantages and applications of the present invention will become apparent to those skilled in the art from the following detailed description.

DETAILED DESCRIPTION OF THE INVENTION

Figure 1:
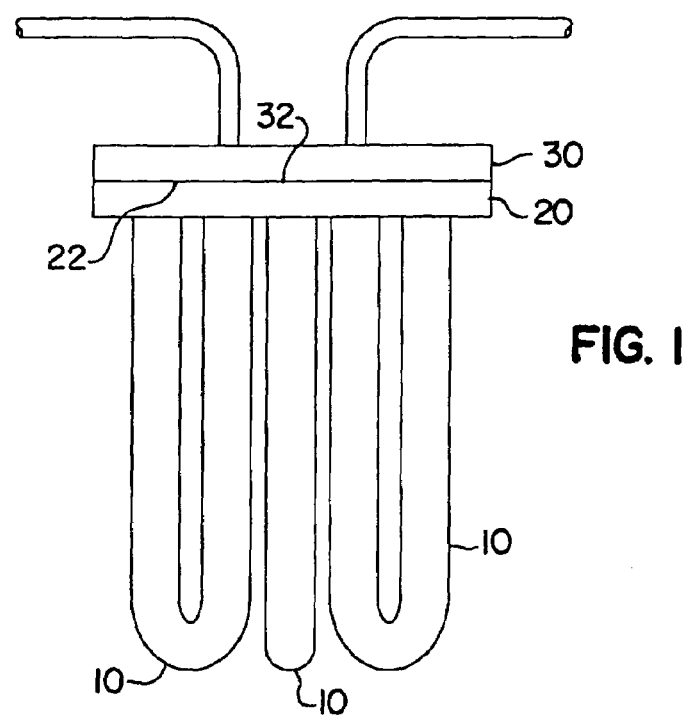
FIG. 1 is a side view of the rotating adsorption bed system.

The present invention may be applied to any process in which it is necessary to contact a fluid with an adsorbent material in order to separate at least one chemical compound from the fluid. The fluid may be either a gas phase or liquid phase mixture. It is preferably intended that the invention applies to a separation process in which a feed stream containing at least two different chemical compounds are passed through a series of adsorbent units, and that the adsorbent material selectively adsorbs one of the chemical compounds. While this invention can be used for more complex fluid-solid adsorption separation operations, the description will be presented in terms of separating one component from a feedstream for purposes of clarity.

Adsorptive separation processes preferably include the sequential performance of three basic steps. First, a feedstream comprising the particular compounds to be separated must be brought into contact with an adsorbent at adsorption conditions. This adsorption step should continue for a time sufficient to allow the adsorbent to adsorb a near equilibrium amount of the preferentially adsorbed compounds. The second basic step is the contacting of the adsorbent while it is bearing both the preferentially and non-preferentially adsorbed compounds with a material which displaces the latter from the adsorbent. The second step is performed in a manner which results in the adsorbent and the interstitial void spaces between adsorbent particles containing significant quantities of only the preferentially adsorbed feed component and the material used to displace the non-preferentially adsorbed compounds. The third basic step of the adsorptive separation process is the desorption of the preferentially adsorbed compounds, and is performed by contacting the adsorbent with a desorbent stream. The desorbent stream contains a chemical compound capable of displacing or desorbing the preferentially adsorbed compound from the adsorbent to thereby release the compound and prepare the adsorbent for another adsorption step. For a large scale system, it is not practicable to move the adsorption units, and then the process entails using a complex piping system to continuously reroute the feeds and drawoffs to the adsorption units. This is referred to as a simulated moving bed, or SMB, system. In a small scale system, the crossover piping results in a system with significant back mixing in the cross-over connections. It is preferable to move the adsorbent, or to move a series of adsorption units relative to the feeds and drawoffs for the adsorption-separation system.

A preferred utilization of the present apparatus is a process in which the movement of the units of selective adsorptive material is performed to obtain the effects of the countercurrent flow of the unit of solid material and various entering fluid streams such as the feed and desorbent streams. This unit movement is performed in part by creating a series of units connected to a rotary plate and rotating the plate and units around an axis which shifts the positions of the units relative to the feed and drawoff streams.

It is preferred for operation of this invention that the fluid flows through the units of adsorbent in a substantially "plug flow" flow regime. That is, it is desired for the entire cross section of the adsorbent units to be evenly swept by the flowing fluid, with the fluid having a relatively uniform velocity and composition at all different points across the entire cross section of the unit. The separational abilities and capacity of any particular adsorbent unit is in part governed by the degree of uniformity of the fluid flow through the unit since nonuniform flow can lead to back mixing, poor utilization of the adsorbent in some areas of the unit, and a dilution of the streams withdrawn from the unit with undesired materials which are also present in the process such as raffinate or desorbent materials.

The invention is an apparatus that is a small scale module for the separation of different chemical compounds using adsorption units. The apparatus comprises a plurality of adsorption units, with each adsorption unit having an inlet and an outlet, serially linked together to form a long virtual bed, wherein the outlet of one adsorption unit is in fluid communication with the inlet of a successive adsorption unit. There are a minimum of three adsorption units in the apparatus. The apparatus further comprises a valve for shifting the fluid communications of the net flow lines from a first adsorption unit to a second adsorption unit. The apparatus can have as few as three adsorption units, but preferably will have from 24 to 256 units, and more preferably have from 32 to 64 units.

The valve comprises a rotating plate assembly having a disk shape with a substantially flat sealing surface. The rotating plate further comprises a plurality of ports, where there are two ports for each adsorption unit, with each adsorption unit inlet in fluid communication with one of the ports, and each adsorption unit outlet in fluid communication with the other of the two ports. The rotating plate ports are disposed in an array around an axis of rotation. The valve further comprises a stationary plate having a substantially flat sealing surface in contact with the sealing surface of the rotating plate. The stationary plate includes a plurality of ports equal to the number of ports on the rotating plate. The ports on the stationary plate are disposed in an array to periodically align with the ports on the rotating plate as the rotating plate rotates about the axis of rotation. The stationary plate further includes a plurality of connecting conduits, equal to one less than the number of adsorption units. The connecting conduits connect pairs of ports on the stationary plate, leaving two ports unconnected to a conduit.

In one embodiment, the design comprises an inlet for a desorbent, an inlet for a feedstream, an outlet for an extract stream, and an outlet for a raffinate stream. The two ports on the stationary plate unconnected to a conduit provide for a high pressure inlet port, which is usually the desorbent inlet, and a low pressure outlet, which is usually for the raffinate stream. The feedstream inlet and the extract outlet are at intermediate positions along the stationary plate and each connects to a conduit. The invention further permits additional inlets and outlets to transfer intermediate flows to and from the moving bed. This permits further separation of chemical components from the feedstream, and/or selective heating or cooling of intermediate streams in the moving bed. In an embodiment with additional inlet and outlet streams, the number of connecting conduits may be reduced by one for each pair of inlet and outlet streams.

One of the advantages of moving the adsorption units with the rotating plate assembly is that the connecting conduits for establishing fluid communication from one adsorption unit to the next adsorption unit can be minimized in size and length thereby minimizing mixing within the connecting conduits. This mixing problem is discussed in some detail in U.S. Pat. No. 3,706,812. When the adsorbent units are arrayed around the axis of rotation, the ports on the stationary plate are also arrayed around the axis of rotation. The ports can be arrayed in a circumferential manner, a radial manner, or at some angle in between. A preferred array is to stagger the ports to minimize the length of the connecting conduits.

The invention further includes at least four net flow ports, or at least two net flow inlet ports and at least two net flow outlet ports. The inlet ports provide for the input of a feed comprising a mixture, and a feed for a desorbent to remove the preferentially adsorbed substance. The outlet ports provide for the removal of an extract stream comprising the adsorbed substance and desorbent, and for the removal of a raffinate stream comprising the remaining substances present in the feed stream.

While there are many variations, a six unit example of the apparatus will be described to highlight features of the invention. FIG. 1 is a side view of the rotating adsorption unit system. The apparatus comprises six adsorption units 10 affixed to a rotating plate assembly 20. The adsorption units 10 are depicted as U-shaped tubes containing an adsorbent within the tubes, and each unit has an inlet and an outlet in fluid communication with a port on the rotating plate 20.

Therefore the total number of ports on the rotating plate 20 is equal to the total number of inlets and outlets of the adsorption units 10. The rotating plate assembly 20 has a substantially flat sealing surface 22 which is in contact with a stationary plate assembly 30. The stationary plate assembly has a substantially flat seating surface 32 that is in contact with the sealing surface 22 and forms a fluid tight seal when the surfaces 22 and 32 are pressed together.

Figure 2:
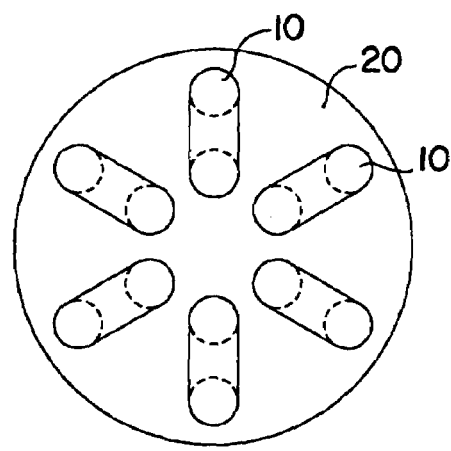
FIG. 2 is a bottom view of the rotating adsorption bed system.

FIG. 2 is a bottom view of the six unit system showing a radial distribution of the adsorption units 10. In the carousel design of this apparatus, the adsorbent units 10 can be arranged radially, as shown in FIG. 2, circumferentially, or in any manner that provides for appropriate attachment to the ports on the rotating plate 20. In this example, the ports are arrayed in an inner ring of 6 ports and an outer ring of 6 ports, where the inner ring ports are inlet ports and the outer ring ports are outlet ports. Each adsorbent unit has an inlet connected to one inner ring port and one outer ring port.

Figure 3:
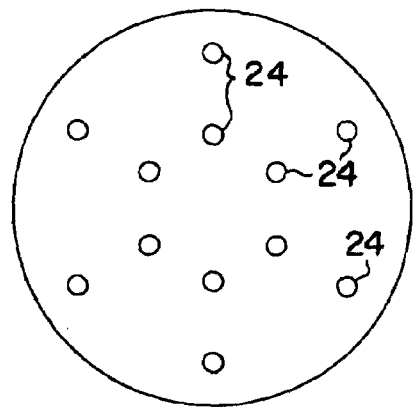
FIG. 3 is a view of the rotating plate assembly sealing surface.
Figure 4:
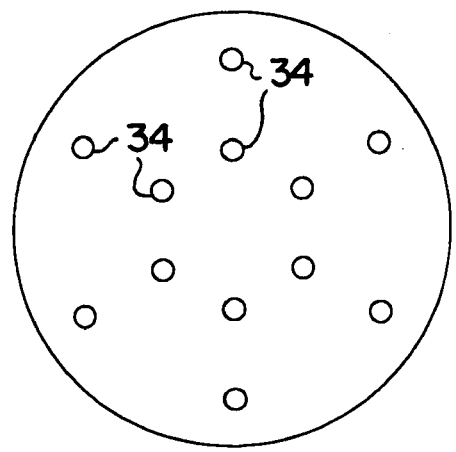
FIG. 4 is a view of the stationary plate assembly seating surface.
Figure 5:
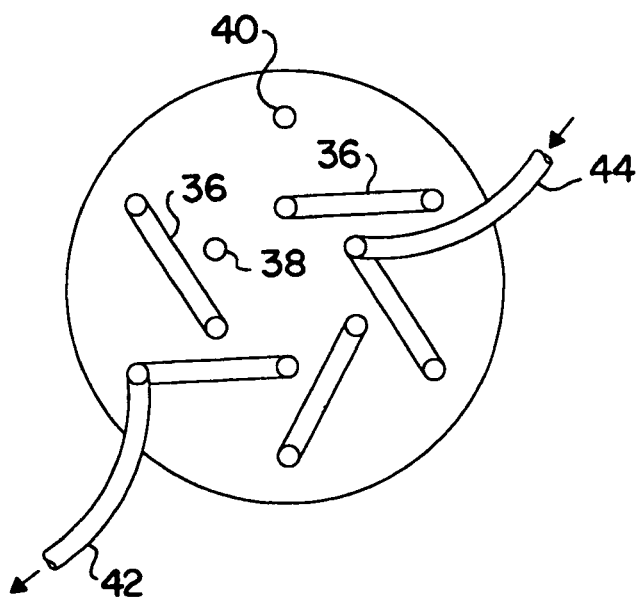
FIG. 5 is a view of the stationary plate assembly with the connecting conduits.

The ports on the rotating plate assembly 20 pass through the plate 20 from the side with the adsorbent units 10 attached to the side with the sealing surface 22. In the simplest design, the rotating plate assembly 20 comprises a regular array of ports 24 distributed around an axis of rotation, as shown in FIG. 3. The stationary plate assembly 30 has a corresponding array of ports 34, as shown in FIG. 4, which when rotated relative to the rotating plate assembly 20, periodically align with the ports 24 on the rotating plate assembly 20. On the stationary plate assembly 30, conduits connect pairs of ports, as shown in FIG. 5, and are on the side away from the seating surface 32. In this example, the stationary plate assembly 30 has an inner ring of ports and an outer ring of ports, with the inner ring of ports in fluid communication with the inner ring of ports on the rotating plate assembly 20 and the outer ring of ports in fluid communication with the outer ring of ports on the rotating assembly 20. The conduits 36 connect an outlet port in fluid communication with one adsorbent unit 10 to an inlet port in fluid communication with a neighboring adsorbent unit 10. The number of conduits 36 is one less than the number of adsorbent units 10 and leaves one pair of ports 34 unconnected.

The remaining pair of ports 34 provide an inlet 38 and an outlet 40 for the apparatus, and are the high pressure point, the inlet 38, and the low pressure point, the outlet 40, for the apparatus. This creates a circuit beginning at the inlet 38 passing through each adsorption unit sequentially and ending at the outlet 40. In addition, the stationary plate assembly 30 includes an additional outlet 42 and an additional inlet 44 provided at intermediate positions between the inlet 38 and the outlet 40.

The positioning of the distribution and collection ports for connection to the net flow conduits on the stationary plate and positioning the adsorption beds onto the rotating plate provides for a more convenient system without the complicated cross-over connections normally required for the rotary valve. As the number of beds increases, and bed sizes decrease, this approaches the equivalent of flowing the solid adsorbent through the system, and as such since the beds are moving we are referring to this as an actual, or true, moving bed system, or TMB. This differs from a simulated moving bed (SMB) system, in that the dead space between the neighboring beds is reduced to a minimum, reducing the amount of back mixing and therefore allowing for a better separation of the chemical compounds by maintaining the sharp concentration fronts of the compounds for improved purity, and instead of moving the inlet streams and outlet streams through a rerouting of piping connections, we are moving the adsorbent beds. The beds are moved in a countercurrent direction relative to the motion of the fluid phase.

During operation, the rotating plate assembly 20 is moved about the axis of rotation and the ports 24 on the rotating plate assembly 20 move and realign with different ports 34 on the stationary plate assembly 30. While there is fluid communication between the rotating ports 24 and the stationary ports 34, flow continues through the adsorption units 10. During the rotation of the rotating plate assembly 20 and the adsorption units 10, there is an interval of time where flow is interrupted and there is no fluid communication between the rotating ports 24 and the stationary ports 34. After that interruption interval fluid communication is reestablished between the rotating ports 24 and the stationary ports 34, but in a different sequence. While the sequence of connections from one adsorption unit 10 to the next adsorption unit 10 remains unchanged, the relative positions of the adsorption units 10 move with respect to the inlet ports 38, 44, and outlet ports 40, 42.

The operation can rotate the adsorption units 10 and rotating plate assembly 20 in a step-wise manner, or in a continuous manner. When operated in a step-wise manner, the rotating plate assembly 20 is in one position for a predetermined period of time with the rotating ports 24 aligned with the stationary ports 34. Then the rotary plate assembly 20 is rotated a predetermined angle, and the rotating ports 24 are aligned with the stationary ports 34 in a different order. The flow of fluid through the adsorption units 10 continues in the same direction, but the movement of the adsorption units 10 has repositioned the adsorption units 10 relative to the stationary inlets 38, 44 and outlets 40, 42. To ease the pressure pulses caused by the intermittent flow interruptions due to the interruptions in the fluid communication between the rotating ports 24 and the stationary ports 34, a smear plate is used in part of the stationary plate assembly 30. The smear plate also permits continuous rotation of the adsorption units 10 and the rotary plate assembly 20.

The rotating plate assembly 20 and the stationary plate assembly 30 can be held together in a number of ways, such that the sealing surface 22 and the seating surface 32 maintain a seal while permitting the rotating plate assembly 20 to rotate. These methods are well known to those skilled in the art and are not described here.

Figure 6:
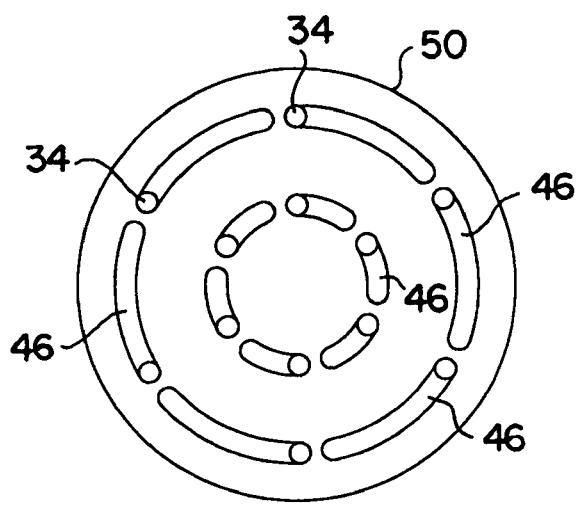
FIG. 6 is a view of a smear plate for use in the rotary valve.

A smear plate is a plate with channels defined within the plate to enable fluid communication between stationary ports 34 and rotating ports 24 for a greater time and distance over when the stationary ports 34 overlap with the rotating ports 24. A smear plate 50, as seen in FIG. 6, comprises stationary ports 34 for fluid connection with the connecting conduits 36 and the inlets 38, 44 and outlets 40, 42. The smear plate 50 further comprises channels 46 in fluid communication with the stationary ports 34. When the sealing surface 22 is in contact with the seating surface 32, and moves about the axis of rotation, the rotating ports 24 maintain fluid communication with the stationary ports 34 through the channels 46 through a greater arc of rotation. The channels 46 are separated by a gap equal to at least the diameter of the rotating ports 24. This prevents crossover flow when the rotating plate assembly 20 advances the adsorption units 10 to have fluid communication with the subsequent stationary ports 34. The channels 46 are etched or machined into the plate 50 by means known in the art. The channel design of the smear plate channels 46 is not limited to following a path lying on the same circumference as ports 34. The ports 34 connected to the channels 46, optionally, may be offset to provide more compact designs, or to provide equal lengths of inlet and outlet smear channels for better balance of pressures and flows.

The smear plate 50 provides for a more continuous operation during the movement of the adsorbent units, and allows for a continuous rotation of the adsorbent units. In one embodiment the smear plate 50 is part of the stationary plate assembly 30 and the channels 46 extend from the ports 34 in the direction opposite the direction of rotation of the rotating plate assembly 20. In another embodiment, the smear plate 50 is part of the rotating plate assembly 20, and the channels 46 extend from the ports 34 in the direction of rotation of the rotating plate assembly 20. This operation effects the movement of the opposing plate port over the closed end of the channel 46 and purges the material in the smear channel, thus reducing back mixing problems.

An overview of the process of separation using adsorption is known in the art and described in U.S. Pat. No. 5,705,061, which is incorporated in its entirety by reference. With the present invention, the stationary plate assembly 30 has at least two net flow inlet ports 38, 44 and at least two net flow outlet ports 40, 42. In one embodiment, a feedstream of desorbent enters the apparatus at the high pressure inlet 38, and a drawoff stream of raffinate is taken at the low pressure outlet 40. There are two intermediate net flow streams spaced at intermediate positions between the high pressure inlet 38 and low pressure outlet 40. The intermediate streams are a drawoff stream of extract at the intermediate outlet 42, and a feedstream of compounds to be separated at the intermediate inlet 44. The extract stream is the stream containing the compound that preferentially adsorbs onto the adsorbent, and the raffinate stream is a stream containing the compounds that remain after the adsorbed compound is removed from the feed stream. The positioning of the intermediate outlet 42 and intermediate inlet 44 are determined from the properties of the adsorbent, the feed composition, the choice of desorbent, and the operating conditions. The material properties and operating conditions determine the relative sizes of the adsorption, purification, and desorption zones, and therefore determine the relative positioning of the intermediate outlet 42 and inlet 44.

The invention may optionally include additional intermediate adsorption units that periodically are off line. By off line, it is meant that during the process of rotating the rotating plate assembly 20, some adsorption units are moved to positions that are not in fluid communication with any of the stationary ports 34. An equivalent to having adsorption units off line is for the number of connecting conduits 36 to be two or more less than the number of adsorption units 10.

Figure 7:
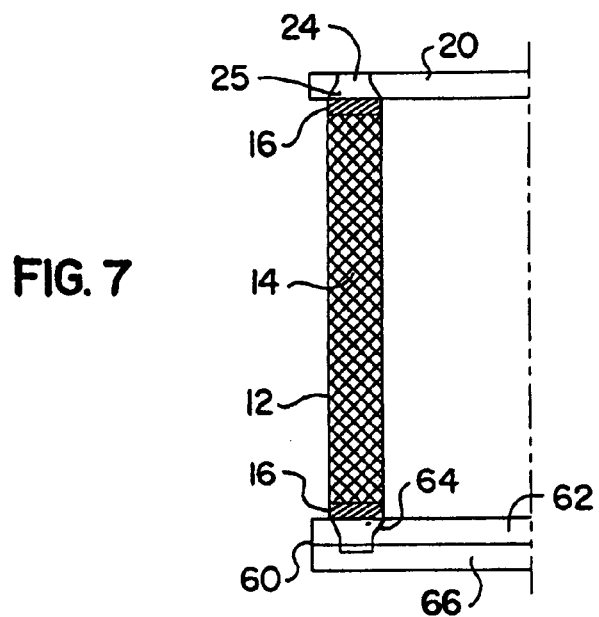
FIG. 7 is a view of an adsorbent bed assembly with the rotating plate and a base plate.

The adsorption units 10 can comprise a plurality of adsorption beds. In one embodiment, each adsorption unit 10 comprises a pair of adsorption beds having a conduit connecting each pair of beds, such that each pair of adsorption beds and conduit form the equivalent of a U-shaped tube. This provides a preferred structure for an adsorption unit 10 having a downflow section and an upflow section. An adsorption bed of the present invention is shown in FIG. 7. The adsorption bed 12 comprises ½ of an adsorption unit 10, and is designed as a tubular structure filled with an adsorbent 14. The adsorption bed 12 is fitted with a porous frit 16 on each end to hold the adsorbent 14 in place. In a preferred embodiment, the frits are sized to be slightly larger than the adsorption unit tube. The frits may sit in a recess in the tube having a slightly larger diameter than the diameter for the adsorbent bed, providing for more stability and a better distribution of the fluid into the adsorbent bed. The adsorption bed 12 has a first end that fits into a conduit 25 that has been beveled and connects the adsorption bed 12 to the rotating port 24. The beveled conduit 25 contributes to improving fluid distribution over the bed inlet and in achieving plug flow of the fluid. The adsorption bed 12 has a second end that is opposite to the first end fits into a base plate assembly 60 that comprises a plate 62 having a port 64 to match the second end, and a plate 66 with a channel to connect two ports 64 of the base plate assembly thereby completing the fluid circuit. This design provides for convenient manufacture of the system and enables quick and convenient assembly as well as the ability to easily replace adsorption beds 12. In addition, the wall of the adsorbent bed 12 is preferably smooth and made of a material that does not have any adsorption properties relative to the components in the feed mixture.

Other designs are possible, and it is intended that the invention cover functionally equivalent systems wherein the adsorption unit 10 comprises one or more adsorption beds 12 and the inlet and outlet to an adsorption unit 10 are in fluid communication with two ports 24 on the rotating plate assembly 20.

The rotating plate assembly 20 may be a single plate, or comprised of a plurality of plates to simplify the manufacture. In its simplest form the rotating plate assembly 20 is a single plate with the number of ports 24 equal to twice the number of adsorption units 10. The rotating plate is preferably designed with the inlet and outlet ports arrayed equally spaced in a radial manner around the axis of rotation. The inlet ports are arrayed at a first predetermined distance from the axis of rotation, and the outlet ports are arrayed at a second predetermined distance from the axis of rotation. This provides for a simpler and more continuous movement of the adsorption units 10 relative to the net flow inlet ports 38, 44 and net flow outlet ports 40, 42. Preferably, the inlet and outlet port for a given adsorption unit 10 do not lie on the same radial line, but are staggered to minimize the length of the conduits connecting the outlet port of one adsorption unit 10 to the inlet port of a sequential adsorption unit 10. One possible distribution is for the outlet of one adsorption unit 10 and the inlet of a subsequent adsorption unit 10 to lie at different positions on the same radial line.

Figure 8:
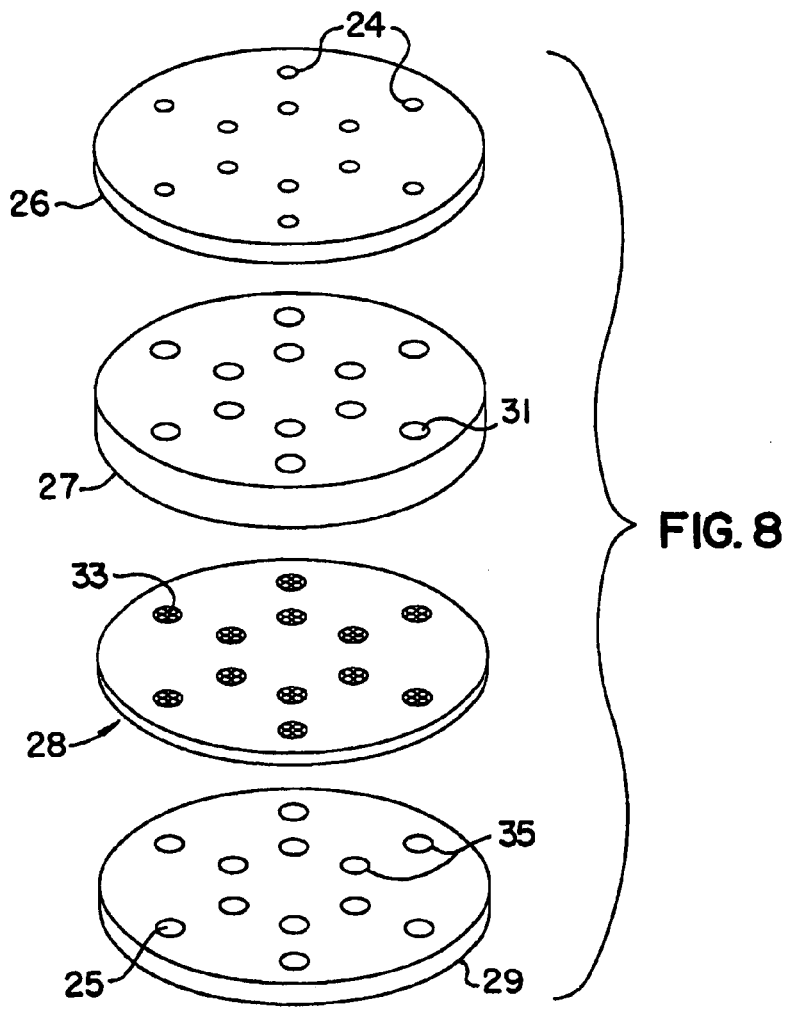
FIG. 8 is the rotating plate assembly using 4 plates.

However, convenience of manufacture leads to a rotating plate assembly 20 that comprises a series of plates. FIG. 8 shows one such configuration. It is preferable that the inlet to an adsorption unit 10 has a feed that is distributed evenly across the adsorption bed 12. The rotating plate assembly 20 is comprised of four plates in this embodiment. The four plates are stacked in order with a sealing plate 26 having the rotating ports 24, an upper distribution plate 27, a lower distribution plate 28, and an adsorption unit sealing plate 29. The upper distribution plate 27 has conduits 31 through the plate 27 that expand the cross-section of the channels from the rotating ports 24 to match the cross-section of the adsorption beds 12. The conduits 31 can be beveled, a step change, or any appropriate channel diameter change. The lower distribution plate 28 has conduits 33 that correspond to the conduits 31 in the upper distribution plate 27. The conduits 33 have a distribution screen across the conduits 33. The distribution screen can be a screen, or merely smaller distribution holes through the lower distribution plate 28, or any equivalent design to distribute the flow substantially evenly across the conduits 33. The lower distribution plate 28 is, in general, much thinner than the upper distribution plate 27. The adsorption unit sealing plate 29 comprises adsorption bed ports 35 that fit sealingly over the ends of the adsorption beds 12. The adsorption bed ports 35 are sized to match the corresponding conduits 33 in the lower distribution plate 28 while the frits are sized to be larger. These plates 26, 27, 28, 29 are held together to form the rotating plate assembly 20. They can be permanently held together, or held together by means that enables disassembly.

In an alternate embodiment of the rotating plate assembly 20, plates 27, 28, and 29 can be a single plate having beveled ports for expanding the cross-sectional areas from the rotating ports 24 of plate 26 to the cross-section of the adsorption beds 12. The single plate may include frits that have been press fitted with a mechanism such as a locking ring, to hold the frit in place. Other alternate embodiments may include more or fewer plates wherein the choice may be decided due to manufacturing considerations. A design consideration around the frits is keeping the frits in their intended positions to prevent maldistribution of fluid across the adsorption bed inlets.

The materials of construction can be any durable and rigid material, that is impermeable to chemicals and does not exhibit preferential adsorption properties relative to the feed components. One embodiment is a metal body, such as stainless steel or other corrosion resistant metal, lined with an inert polymeric material, such as TEFLON™. Another embodiment is injection molded plastic bodies with a rigid impermeable plastic. The sealing plate 26 is preferably made of a lubricious polymeric material to provide a seal as well as allowing the sealing plate 26 to slide against the seating surface 32 of the stationary plate assembly 30. A preferred material is TEFLON™, or other polyfluorinated polymeric material. In an alternative, the sealing plate, or the sealing surface 22 of the rotating plate assembly 20 is coated with a lubricious polymeric material, or other friction reducing wear seals.

In an alternative, the seating surface 32 of the stationary plate assembly 30 is coated with the lubricious polymeric material, or a seating plate of the stationary plate assembly 30 is made from the lubricious polymeric material.

Figure 9:
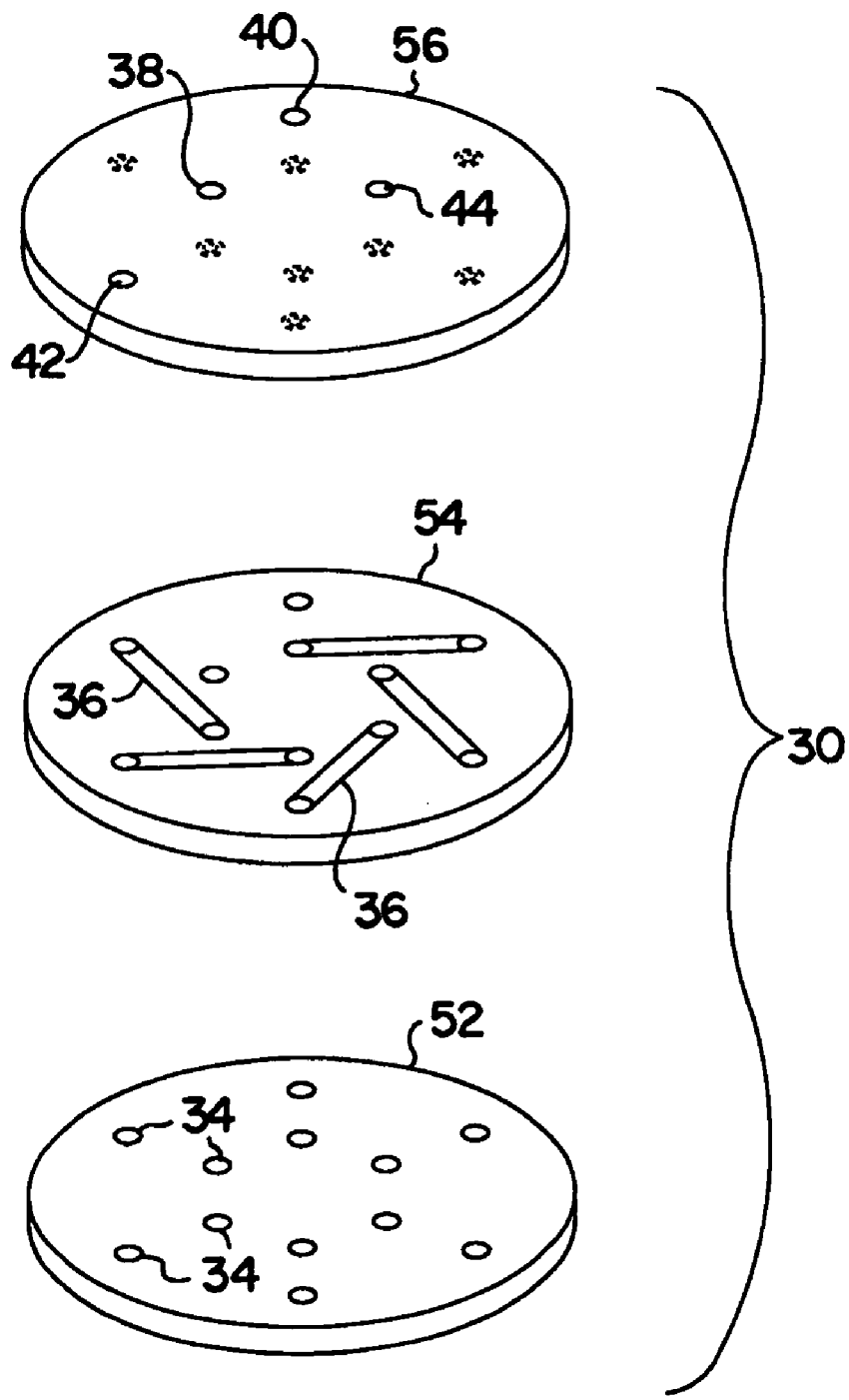
FIG. 9 is the stationary plate assembly using 3 plates.

The stationary plate assembly 30 can be a single plate with conduits attached to connect stationary ports 34 as shown in FIGS. 4 and 5. FIG. 4 shows the seating surface side of the stationary plate assembly 30, and FIG. 5 shows the opposite side of the assembly 30 with connecting conduits 36 making fluid connections between pairs of the stationary ports 34. The stationary plate assembly 30 can also be comprised of a plurality of plates, with each plate providing a portion of the assembly. One embodiment of the stationary plate assembly 30 is shown in FIG. 9 and comprises three plates. A lower plate 52 comprises the stationary ports 34 which pass through the plate, and which has the same hole pattern as the sealing plate 29 of the rotating plate assembly 20. A middle plate 54 is a groove plate and comprises grooves or channels 36 formed in a pattern so as to connect pairs of stationary ports 34 when the groove plate 54 is positioned on the seating plate 52. An upper plate 56 provides ports for connections to the net flow lines. In this embodiment, two of the net flow lines 38, 40 align with holes on the groove plate 54 that do not have a link to a connecting channel 36. The remaining two net flow lines 42, 44 are positioned to align with an appropriate channel 36 or channel terminus, where a feed and drawoff occur at intermediate positions in the overall fluid circuit. In one alternate embodiment, the channels 36 are defined in upper plate 56 on the surface facing lower plate 52, or in the alternative the channels 36 are defined in lower plate 52 on the surface facing upper plate 56.

Optionally, the lower plate 52 includes smear channels 46 on the seating surface side of the lower plate 52. It is also preferred that the lower plate 52 be fabricated from a lubricious polymeric material, such as TEFLON™ or other similar fluorocarbon polymer, or that the seating surface of the lower plate be coated with an appropriate lubricious polymeric material. In this invention, the stationary plate assembly 30 has a surface that slides against a surface of the rotating plate assembly 20. It is envisioned that one of the surfaces or both are either coated with a lubricious polymeric material, or made from a lubricious polymeric material to provide a sealing, low friction interface.

The apparatus further comprises a means for rotating the rotating plate assembly 20 and the adsorption units 10. In one embodiment, the rotating plate assembly 20 is of a circular design and has teeth for a gear formed around the edge of the assembly 20. A motor and gear system (not shown) connect to the assembly 20 and rotate the system at a predetermined rate. A motor and belt driven system are also possible for rotating the adsorption units 10 and rotating plate assembly 20. The rate of rotation is determined by a number of factors, which include the number of adsorption units, and the speed with which the fluid flows through the adsorption beds. The use of a variable speed drive to set the rotation rate of the adsorption units is a factor contributing to the optimization of the separation process, with the speed set at different rates for different mixtures.

Another embodiment comprises a central shaft attached to the rotating plate assembly 20. The central shaft (not shown) can be directly driven to an electric motor to turn the assembly 20, or can be connected by either a belt drive, or direct drive gears. The advantage to using direct drive gears is that the speed of rotation can be further controlled by adding gears of different sizes. Technology for rotating systems is well known in the art and the means for rotating the adsorption units 10 and the rotating plate assembly 20 is intended to cover these known systems.

The adsorbent particles may be in the form of any shape and of any size suitable for use in adsorption separation processes. The composition of the adsorbent is not a controlling factor in the invention, and may use any commercially available adsorbent, or combination of adsorbents. Adsorbents used in adsorption separation processes can be found in U.S. Pat. Nos. 6,600,083; 6,410,794; 6,004,518; 5,705,061; 5,441,559; 4,632,149; and 4,378,292, all of which are incorporated by reference in their entirety.

Optionally, the apparatus includes the ability to efficiently add zones of heating and cooling, wherein the adsorption units 10 can move through the different zones to enhance adsorption and desorption of selected compounds from a feedstream.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An apparatus for an adsorption separation system comprising:
   at least three adsorbent units, each unit comprising an adsorbent bed, an inlet port, and an outlet port;
   a rotating plate assembly having a disk shape with a substantially flat sealing surface, having a plurality of rotating plate ports equal to the number of inlet and outlet ports of the adsorbent units with a plate port in fluid communication with one of the inlet ports and a second plate port in fluid communication with one of the outlet ports of the adsorbent units, and the rotating plate ports disposed around an axis of rotation;
   a stationary plate assembly with a substantially flat seating surface in contact with the rotating plate sealing surface, having a plurality of stationary plate ports equal to the number of rotating plate ports;
   a plurality of connecting conduits equal to one less than the number of adsorbent units, each conduit having an inlet and an outlet and connecting two stationary plate ports, wherein each conduit provides fluid communication between a first adsorbent bed outlet port and a second adsorbent bed inlet port, and leaving two of the stationary plate ports unconnected to connecting conduits; and
   means for rotating the rotating plate and the adsorbent units around the axis of rotation;
   wherein one of the two unconnected stationary plate ports is in fluid communication with a first fluid inlet, and the other of the two unconnected stationary plate ports is in fluid communication with a first fluid outlet, one of the connecting conduits is in fluid communication with a second fluid inlet, and one of the connecting conduits is in fluid communication with a second fluid outlet, and wherein the rotating plate assembly comprises a plurality of plates, including a matching plate for matching ports on the rotating plate with the ports on the stationary plate, and an adsorbent bed plate for matching the ports on the rotating plate with the adsorbent bed inlet and outlet ports.

2. The apparatus of claim 1 wherein the adsorbent units are releasably attached to the rotating plate.

3. The apparatus of claim 2 wherein the stationary plate assembly comprises a plurality of plates, including a plate comprising smear channels.

4. The apparatus of claim 3 wherein the smear channel plate is made from a lubricious polymeric material, or coated with a lubricious polymeric material.

5. The apparatus of claim 1 wherein the rotating plate assembly further comprises a plurality of smear channels equal to the number of rotating plate ports, wherein each smear channel is an extension of a corresponding rotating plate port.

6. The apparatus of claim 1 wherein the stationary plate assembly further comprises a plurality of smear channels equal to the number of stationary plate ports, wherein each smear channel is an extension of a corresponding stationary plate port.

7. The apparatus of claim 1 wherein the adsorbent units are comprised of two adsorbent beds and a conduit connecting the adsorbent beds, wherein one adsorbent bed is a downflow bed and the second adsorbent bed is an upflow bed.

8. The apparatus of claim 7 further comprising a frit disposed at each end of the adsorption beds.

9. The apparatus of claim 1 wherein the means is a motor for rotating a central shaft affixed to the rotating plate assembly around the axis of rotation.

10. The apparatus of claim 1 wherein the means is a motor and gear system for tuning the rotating plate assembly about the axis of rotation.

11. The apparatus of claim 1 wherein the means is a motor and belt driven system for turning the rotating plate assembly about the axis of rotation.

12. The apparatus of claim 1 wherein the means provides for a variable speed rotation.

13. The apparatus of claim 1 wherein the adsorbent units comprise a plurality of adsorbent beds releasably affixed to the rotating plate at the inlet ports and outlet ports creating a plurality of pairs of adsorbent beds with each pair having one end of the adsorbent beds affixed to one inlet port and one outlet port, and each of the pair of adsorbent beds having a distal end in fluid communication with the other of the pair.

14. The apparatus of claim 1 wherein the matching plate in the rotary plate assembly is made from a lubricious polymeric material, or coated with a lubricious polymeric material.

15. The apparatus of claim 1 further comprising a plurality of temperature controlled zones, wherein each zone heats a predetermined number of adsorption units.

16. An apparatus for an adsorption separation system comprising:
- at least three adsorbent units, each unit comprising an adsorbent bed, an inlet port, and an outlet port;
- a rotating plate assembly having a disk shape with a substantially flat sealing surface, having a plurality of rotating plate ports equal to the number of inlet and outlet ports of the adsorbent units with a plate port in fluid communication with one of the inlet ports and a second plate port in fluid communication with one of the outlet ports of the adsorbent units, and the rotating plate ports disposed around an axis of rotation;
- a stationary plate assembly with a substantially flat seating surface in contact with the rotating plate sealing surface, having a plurality of stationary plate ports equal to the number of rotating plate ports;
- a plurality of connecting conduits equal to one less than the number of adsorbent units, each conduit having an inlet and an outlet and connecting two stationary plate ports, wherein each conduit provides fluid communication between a first adsorbent bed outlet port and a second adsorbent bed inlet port, and leaving two of the stationary plate ports unconnected to connecting conduits; and
- means for rotating the rotating plate and the adsorbent units around the axis of rotation;
- wherein one of the two unconnected stationary plate ports is in fluid communication with a first fluid inlet, and the other of the two unconnected stationary plate ports is in fluid communication with a first fluid outlet, one of the connecting conduits is in fluid communication with a second fluid inlet, and one of the connecting conduits is in fluid communication with a second fluid outlet, wherein the adsorbent units are adsorbent beds in U-tubes, with each U-tube having an inlet end and an outlet end.

17. The apparatus of claim 16 wherein the U-tubes are releasably affixed to the rotating plate, with the inlet end of the U-tube in fluid communication with an inlet port, and the outlet end of the U-tube in fluid communication with the outlet port.

18. An apparatus for an adsorption separation system comprising:
- at least three adsorbent units, each unit comprising an adsorption bed, an inlet port and an outlet port;
- a rotating plate assembly having a substantially flat sealing surface, and a plurality of rotating plate ports at least equal to the number of inlet and outlet ports of the adsorbent units, with each adsorbent bed inlet port in fluid communication with a rotating plate port and each adsorbent bed outlet port in fluid communication with a rotating plate port;
- a stationary plate assembly having a substantially flat seating surface in contact with the rotating plate sealing surface, and having a plurality of ports equal to the number of rotating plate ports;
- at least four net flow connections providing at least two inflow connections and two outflow connections for the addition and withdrawal of fluid;
- a plurality of connecting conduits equal to one less than one-half the number of stationary plate ports, each conduit having an inlet and outlet and connecting two stationary plate ports, and wherein each conduit inlet is in fluid communication with an adsorbent unit outlet port and each conduit outlet is in fluid communication with an adsorbent unit inlet port; and
- means for rotating the rotating plate and the adsorbent units around the axis of rotation;
- wherein at least one inflow connection is in fluid communication with a stationary port that is not connected to a connecting conduit and at least one outflow connection is in fluid communication with a stationary port that is not connected to a connecting conduit, and wherein the rotating plate assembly comprises a plurality of plates, including a matching plate for matching ports on the rotating plate with the ports on the stationary plate, and an adsorbent bed plate for matching the ports on the rotating plate with the adsorbent bed inlet and outlet ports.

* * * * *

UNITED STATES PATENT AND TRADEMARK OFFICE
CERTIFICATE OF CORRECTION

PATENT NO. : 7,022,229 B1 Page 1 of 1
DATED : April 4, 2006
INVENTOR(S) : Gavin P. Towler et al.

It is certified that error appears in the above-identified patent and that said Letters Patent is hereby corrected as shown below:

Column 12,
Line 59, replace "tuning" with -- turning --.

Signed and Sealed this

Sixth Day of June, 2006

JON W. DUDAS
*Director of the United States Patent and Trademark Office*